US012580451B2

(12) United States Patent
Krank et al.

(10) Patent No.: US 12,580,451 B2
(45) Date of Patent: Mar. 17, 2026

(54) ROTOR DEVICE FOR AN ELECTRIC MACHINE INCLUDING A COOLING FLUID LINE, A COLLECTING RING, AND AN ADAPTER

(71) Applicant: Bayerische Motoren Werke Aktiengesellschaft, Munich (DE)

(72) Inventors: Benjamin Krank, Munich (DE); Simon Strasinsky, Neufahrn bei Freising (DE); Bernhard Wolf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 211 days.

(21) Appl. No.: 18/283,136

(22) PCT Filed: Apr. 8, 2022

(86) PCT No.: PCT/EP2022/059351
§ 371 (c)(1),
(2) Date: Sep. 20, 2023

(87) PCT Pub. No.: WO2022/233531
PCT Pub. Date: Nov. 10, 2022

(65) Prior Publication Data
US 2024/0171043 A1      May 23, 2024

(30) Foreign Application Priority Data
May 3, 2021      (DE) ..................... 10 2021 111 321.0

(51) Int. Cl.
H02K 9/19 (2006.01)
H02K 1/24 (2006.01)
(52) U.S. Cl.
CPC ................. H02K 9/19 (2013.01); H02K 1/24 (2013.01)

(58) Field of Classification Search
CPC ............ H02K 9/19; H02K 1/24; H02K 1/325; H02K 3/527
See application file for complete search history.

(56) References Cited

U.S. PATENT DOCUMENTS 8,928,195 B2      1/2015   Ohashi et al.
10,461,595 B2   10/2019   Teter et al.
(Continued)

FOREIGN PATENT DOCUMENTS

CN      111384795 A      7/2020
CN      111769674 A     10/2020
(Continued)

OTHER PUBLICATIONS

DE102017213960A1 English translation (Year: 2025).*
(Continued)

*Primary Examiner* — Christopher M Koehler
*Assistant Examiner* — Viswanathan Subramanian
(74) *Attorney, Agent, or Firm* — Crowell & Moring LLP

(57) ABSTRACT

A rotor device for an electric machine, comprising: a rotor which comprises a rotor laminated core having a plurality of pole legs which project radially from a central axis of the rotor and can be wrapped around by respective rotor windings; at least one cooling fluid line, which extends in the circumferential direction between adjacent pole legs with its longitudinal extension direction parallel to the central axis of the rotor, and which is designed for a cooling fluid to flow through it for cooling of the rotor; and at least one collecting ring, which is provided on an end face of the rotor and is designed to collect cooling fluid flowing along the end face and to supply it to the at least one cooling fluid line.

8 Claims, 4 Drawing Sheets

(56)     References Cited

U.S. PATENT DOCUMENTS

| | | | |
|---|---|---|---|
| 2013/0015729 A1 | 1/2013 | Birdi et al. | |
| 2013/0038151 A1* | 2/2013 | Ohashi ................... | H02K 7/086 |
| | | | 310/59 |
| 2014/0265660 A1 | 9/2014 | Kulkarni et al. | |
| 2016/0149451 A1* | 5/2016 | Teter ........................ | H02K 3/24 |
| | | | 310/54 |
| 2019/0305643 A1 | 10/2019 | Huber et al. | |

FOREIGN PATENT DOCUMENTS

| | | |
|---|---|---|
| DE | 10 2017 213 960 A1 | 2/2019 |
| WO | WO 2018/137955 A1 | 8/2018 |

OTHER PUBLICATIONS

CN111384795A English translation (Year: 2025).*
International Search Report (PCT/ISA/210) issued in PCT Application No. PCT/EP2022/059351 dated Aug. 23, 2022 with English translation (5 pages).
German-language Written Opinion (PCT/ISA/237) issued in PCT Application No. PCT/EP2022/059351 dated Aug. 23, 2022 with English translation (10 pages).
German-language Search Report issued in German Application No. 10 2021 111 321.0 dated Dec. 8, 2021 with partial English translation (12 pages).

* cited by examiner

ROTOR DEVICE FOR AN ELECTRIC MACHINE INCLUDING A COOLING FLUID LINE, A COLLECTING RING, AND AN ADAPTER

FIELD

The invention relates to a rotor device for an electric machine.

BACKGROUND AND SUMMARY

Effective rotor cooling of electric drive machines constitutes a main requirement for high continuous power, in particular in the case of current-excited synchronous machines. High continuous power is essential for a dynamic driving performance of motor vehicles, such as, for example, dynamic country road travel. Electric drives having hollow shaft cooling of the rotor by means of water and oil are already known. Too rapid a heating of a rotor may lead to premature heating of the rotor and therefore to degradation of the drive. This can have the effect that essential vehicle goals are not achieved without degradation.

WO 2018/137955 A1 discloses an electric machine having a rotor, which is arranged on a rotor shaft for conjoint rotation, and having a stator, wherein an axial coolant supply line and at least one coolant-conducting radial coolant supply line which is connected to the axial coolant supply line are arranged in the rotor shaft. An interior of the electric machine is connected to the radial coolant supply line so as to conduct coolant. During operation of the electric machine, the coolant can be transported through the rotor or along at least one end face of the rotor. If the rotor consists of a plurality of rotor laminations and is therefore what is referred to as a laminated rotor, the coolant can be conveyed between the individual rotor laminations by the centrifugal force which is generated by the rotating rotor. Introduction of the coolant into the lamination intermediate space causes the interior of the rotor to be cooled.

It is an object of the present invention to provide a solution which permits particularly efficient cooling of a rotor active region of a current-excited synchronous machine.

This object is achieved according to the invention by the subject matter of the present disclosure. Further possible refinements of the invention are disclosed in the description and the figures.

The invention relates to a rotor device for an electric machine, in particular for a motor vehicle, having a rotor and having at least one cooling fluid line. The rotor comprises a laminated rotor core which has a plurality of pole limbs projecting radially from a central axis of the rotor. Respective rotor windings can be wound around these pole limbs. The rotor therefore consists of a plurality of rotor laminations which are stacked in a stacking direction to form the laminated rotor core and which provide the pole limbs projecting radially from the central axis of the rotor. What are referred to as pole shoes can be formed at respective ends of the pole limbs. The cooling fluid line extends between pole limbs, which are adjacent in the circumferential direction, with its direction of longitudinal extent parallel to the central axis of the rotor. Furthermore, the at least one cooling fluid line is designed for a cooling fluid to flow through it for cooling the rotor. Heat can therefore be absorbed from the rotor via the cooling fluid flowing through the cooling fluid line, so as to cool the rotor. Within the at least one cooling fluid line, the cooling fluid can flow between the pole limbs of the rotor parallel to the central axis of the rotor. In particular, the at least one cooling fluid line runs along an entire length of the laminated rotor core, and therefore the at least one cooling fluid line extends longitudinally between the pole limbs, which are adjacent in the circumferential direction, over the entire length of the laminated rotor core. The laminated rotor core can therefore be cooled over its entire length by means of the cooling fluid flowing through the at least one cooling fluid line. If the rotor has the windings surrounding the pole limbs, the at least one cooling fluid line can extend longitudinally between first windings assigned to a first of the pole limbs and second windings assigned to a second pole limb adjacent to the first pole limb. By this means, both the first windings winding around the first pole limb and the second windings winding around the second pole limb can be cooled by means of the cooling fluid flowing through the cooling fluid line. The at least one cooling fluid line therefore permits a particularly advantageous direct cooling of the pole limbs and/or of the windings assigned to the pole limbs, thus permitting particularly efficient operation of the electric machine.

In order to permit particularly good cooling of a respective end face of the rotor by means of the cooling fluid and, furthermore, to ensure precise supplying of the cooling fluid to the at least one cooling fluid line, the rotor device comprises at least one collecting ring which is arranged on an end face of the rotor and which is designed to collect cooling fluid flowing along the end face and to provide the cooling fluid for the at least one cooling fluid line. The at least one collecting ring therefore permits collecting of the cooling fluid flowing along the end face of the rotor, in order to supply the cooling fluid to the at least one cooling fluid line. Consequently, the end face of the rotor can be cooled by the cooling fluid flowing along the end face, and the rotor windings and/or the laminated rotor core of the rotor can be cooled by means of the cooling fluid guided in the at least one cooling fluid line. A particularly large amount of heat can thereby be transported away from the rotor by means of the cooling fluid.

In a further refinement of the invention, provision is made for a cooling fluid line to be provided in the circumferential direction for each intermediate space between adjacent pole limbs. This means that the rotor device comprises precisely as many cooling fluid lines as it comprises pole limbs. Therefore, a pole limb and a cooling fluid line are arranged in a respectively alternating manner in the circumferential direction about the rotor. The cooling fluid lines are in particular each designed to convey the cooling fluid in the opposite direction in comparison to cooling fluid lines which are directly adjacent in the circumferential direction. This means that the cooling fluid lines each have mutually changing and thus alternating cooling fluid directions in the circumferential direction. Cooling fluid lines following one another in the circumferential direction therefore have mutually diametrically opposite cooling fluid guide directions. By this means, when the rotor is cooled by the cooling fluid flowing through the cooling fluid lines, a particularly uniform temperature profile can be set in the rotor. In this case, each of the cooling fluid guide directions runs at least substantially parallel to the central axis of the rotor.

In a further refinement of the invention, provision is made that each cooling fluid line is integrated in a respective cover slide. This cover slide may also be referred to as a "slot cap" or "slot cover". This cover slide is designed to outwardly close slots between adjacent pole limbs in the rotor after a winding process and therefore after winding of the windings in the radial direction about the respective pole limbs. By integration of the respective cooling fluid line in the cover slide, the cooling fluid line can be particularly readily stabilized by the cover slide and, furthermore, can be positioned particularly precisely relative to the respective pole limbs by means of the cover slide. Furthermore, the cover slide can permit stiffening of the respective cooling fluid line.

Provision is made, in a further refinement of the invention, that the at least one cooling fluid line has a length portion in which the cooling fluid line is surrounded circumferentially by a rotor potting compound. In particular, the rotor potting compound can fill an intermediate space between the pole limbs, around which the windings are wound, as a result of which slipping of the respective windings within the rotor can be avoided by means of the rotor potting compound. In addition to holding the windings, this rotor potting compound can hold the at least one cooling fluid line in its position between the pole limbs. For assembly of the rotor device, the rotor laminations can therefore be stacked on one another in the stacking direction to form the laminated rotor core, then the windings can be wound around the pole limbs, the at least one cooling fluid line can be arranged and aligned between the adjacent pole limbs, and then a remaining intermediate space between the pole limbs can be filled with the rotor potting compound. By this means, the at least one cooling fluid line can be held particularly well in its position between the pole limbs.

In a further refinement of the invention, provision is made that the rotor device comprises a hollow shaft on which the rotor is held for conjoint rotation and which predetermines an axis of rotation of the rotor. In particular, the rotor should rotate about the hollow shaft during operation of the electric machine. The hollow shaft is designed for the cooling fluid to flow through it. By this means, heat in the interior of the hollow shaft can be transported away from the hollow shaft, as a result of which, in turn, the rotor held on the hollow shaft can be cooled. Furthermore, the hollow shaft has at least one radial opening via which the cooling fluid can flow out of the hollow shaft in order to flow to the at least one cooling fluid line. The radial opening permits the cooling fluid flowing in the hollow shaft to flow out of the hollow shaft radially. This cooling fluid flowing out of the hollow shaft can be guided to the at least one cooling fluid line in order to permit one single cooling circuit to cool both the hollow shaft from the inside and the rotor via the at least one cooling fluid line. The cooling fluid can therefore flow into the hollow shaft, can cool the hollow shaft from the inside and subsequently can flow into the at least one cooling fluid line in order to cool the pole limbs of the rotor. Therefore, a particularly extensive and in particular particularly uniform cooling of the rotor device can be realized by means of the cooling fluid.

In this connection, provision can be made in particular that the at least one collecting ring surrounds the hollow shaft circumferentially at least over a length portion of the hollow shaft. The at least one collecting ring is designed to collect the cooling fluid, which has emerged from the hollow shaft via the at least one radial opening in the hollow shaft, and to provide the cooling fluid for the at least one cooling fluid line. In particular, a respective collecting ring can be arranged on each end face of the rotor, as a result of which cooling fluid which has emerged radially from the hollow shaft can be collected both on a front side of the rotor and on a rear side of the rotor and supplied to respective cooling fluid lines. By this means, the alternating cooling fluid guide direction of cooling fluid lines arranged adjacent in the circumferential direction is made possible. The collecting ring is designed to use centrifugal forces to collect the cooling fluid flowing out from the hollow shaft. This collected cooling fluid can be deflected in turn to the cooling fluid lines by means of the collecting ring. The at least one collecting ring therefore makes it possible for the cooling fluid which has emerged via the at least one radial opening in the hollow shaft to cool the rotor end face assigned to the collecting ring and subsequently to trap the cooling fluid by means of the collecting ring and provide it for the at least one cooling fluid line. The at least one collecting ring therefore permits the cooling fluid to be transported from the interior of the hollow shaft to the at least one cooling fluid line.

In a further refinement of the invention, provision is made that the collecting ring has a channel which runs in the circumferential direction, is open toward the hollow shaft and in which the collected cooling fluid can be held by centrifugal force. The collected cooling fluid can therefore be temporarily stored in the channel in order to be able to provide the collected cooling fluid to the at least one cooling fluid line. The channel of the collecting ring therefore prevents the cooling fluid from flowing radially past the collecting ring.

In a further refinement of the invention, provision is made that the collecting ring for the at least one cooling fluid line has a fluid opening in which an adapter is inserted. This adapter is designed to supply the cooling fluid collected by the collecting ring to the respective cooling fluid line adjacent to the adapter. In other words, the adapter produces a fluidic connection between the channel of the collecting ring and the cooling fluid line, which is fluidically connected to the adapter, in order to guide the cooling fluid collected in the channel to the associated cooling fluid line. The adapter can therefore be designed in particular to deflect the cooling fluid collected in the channel into the associated cooling fluid line. In particular, for each cooling fluid line which is to be supplied with cooling fluid collected in the channel, the collecting ring can have a fluid opening in which a respective adapter is inserted. The adapter for the fluidic connection of the collecting ring, in particular the channel, to the at least one cooling fluid line makes it possible, when providing the rotor device, for the at least one cooling fluid line to be able to be arranged between the pole limbs which are adjacent to one another in the circumferential direction, and optionally to be able to be fixed within the rotor by the rotor potting compound. Subsequently, the at least one collecting ring can be arranged on the end face of the rotor and aligned relative to the rotor. As soon as the collecting ring is aligned relative to the rotor, the adapter for each cooling fluid line which is to be connected to the collecting ring can be inserted into the respective fluid opening in the collecting ring and connected to the associated cooling fluid line. The at least one adapter therefore makes it possible for manufacturing tolerances of the rotor and/or of the collecting ring to be able to be compensated for by aligning the collecting ring relative to the rotor. A particularly precise and tight fluidic connection of the collecting ring to the at least one cooling fluid line can therefore be ensured via the adapter.

In a further refinement of the invention, provision is made that the adapter has a slot, in particular a circumferential slot, which is designed to form a form fit with the rotor potting compound of the rotor. This means that the adapter can be held in the rotor potting compound via a form fit, as a result of which release of the adapter from the collecting ring can be avoided with a particularly high degree of reliability. During the assembly of the rotor device, provision can therefore be made that the at least one cooling fluid line is arranged between the pole limbs, which are arranged adjacent to one another in the circumferential direction, the collecting ring is arranged and aligned on the end face of the rotor, the at least one adapter is inserted into the associated fluid opening in the collecting ring and connected to the associated cooling fluid line, and subsequently a free space between the pole limbs which are adjacent in the circumferential direction and the windings thereof is filled with the rotor potting compound which is used both to fix the cooling fluid line between the pole limbs and to form the form fit with the adapter. By this means, the risk of the adapter being released from the collecting ring can be kept particularly low.

In a further refinement of the invention, provision is made that on each cooling fluid line there is arranged an outlet element via which the cooling fluid, after flowing through the respective cooling fluid line, can flow out from the latter, the outlet element being designed to deflect the cooling fluid outward in the radial direction. This outlet element can be formed in particular structurally identically to the adapter. This means that the adapter adjoins the first end of the respective cooling fluid line and the outlet element adjoins the second end of the respective cooling fluid line. The adapter is designed to supply the cooling fluid to the respective cooling fluid line, in particular from the respective collecting ring, whereas the outlet element is designed to conduct the cooling fluid out of the cooling fluid line, in particular in the radial direction of the rotor. In particular, the adapter can be inserted into a first collecting ring on a first end face of the rotor, and the outlet element can be inserted into a second collecting ring on a second end face of the rotor opposite the first end face. In the case of respective, mutually alternating cooling fluid guide directions of cooling fluid lines which are adjacent to one another in the circumferential direction, the respective collecting rings can each have adapters and outlet elements inserted in an alternating manner in the circumferential direction. Analogously to the at least one adapter, the at least one outlet element can likewise have a slot which can form a form fit with the rotor potting compound. The respective guidance of the cooling fluid toward the at least one cooling fluid line and away from the at least one cooling fluid line by means of the adapter and by means of the outlet element, respectively, permits a particularly simple assembly of the rotor device, with tolerances of respective components of the rotor device being able to be compensated for particularly well. The adapter and the outlet element can be constructionally identical.

Further features of the invention can arise from the claims, the figures and the description of the figures. The features and combinations of features mentioned above in the description and also the features and combinations of features shown below in the description of the figures and/or in the figures alone can be used not only in the respectively stated combination, but also in other combinations or on their own without departing from the scope of the invention.

DETAILED DESCRIPTION

In the figures, identical and functionally identical elements are provided with the same reference signs.

Figure 1:
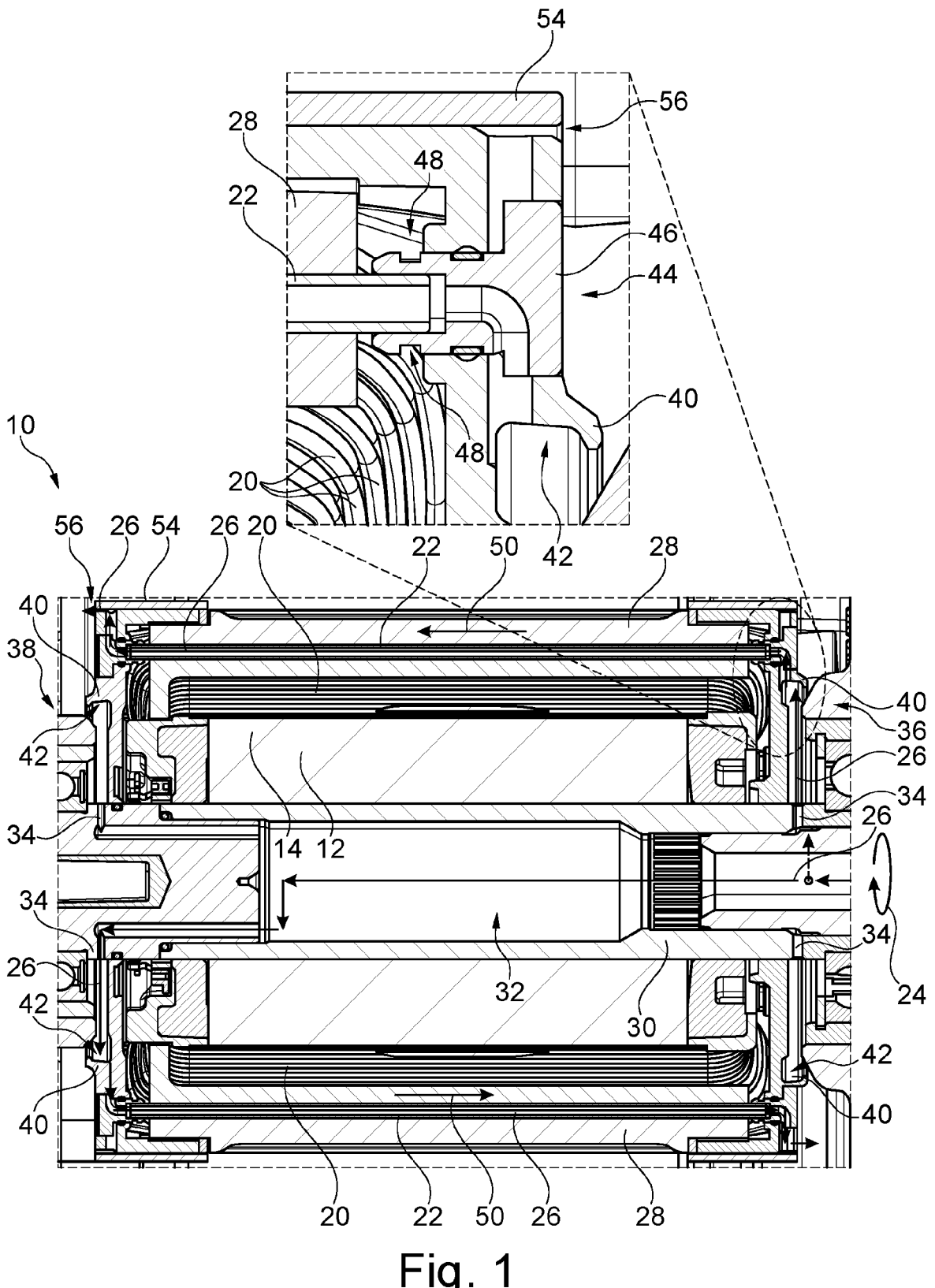
FIG. 1 shows a schematic sectional view of a rotor device and a partial enlargement of the rotor device with a hollow shaft, on which a rotor is held for conjoint rotation, wherein the rotor comprises a plurality of pole limbs which project radially from a central axis of the hollow shaft and between which respective cooling fluid lines are arranged in the circumferential direction, by means of which cooling fluid which has flowed out of the hollow shaft can be guided between respective windings winding around the pole limbs of the rotor.

FIG. 1 shows a rotor device 10 for an electric machine. This electric machine can be designed in particular to drive a motor vehicle with electrical energy. In addition to the rotor device 10, the electric machine can comprise a stator, with electrical energy being able to be converted into mechanical torque by interaction between the rotor device 10 and the stator.

Figures 2, 3:
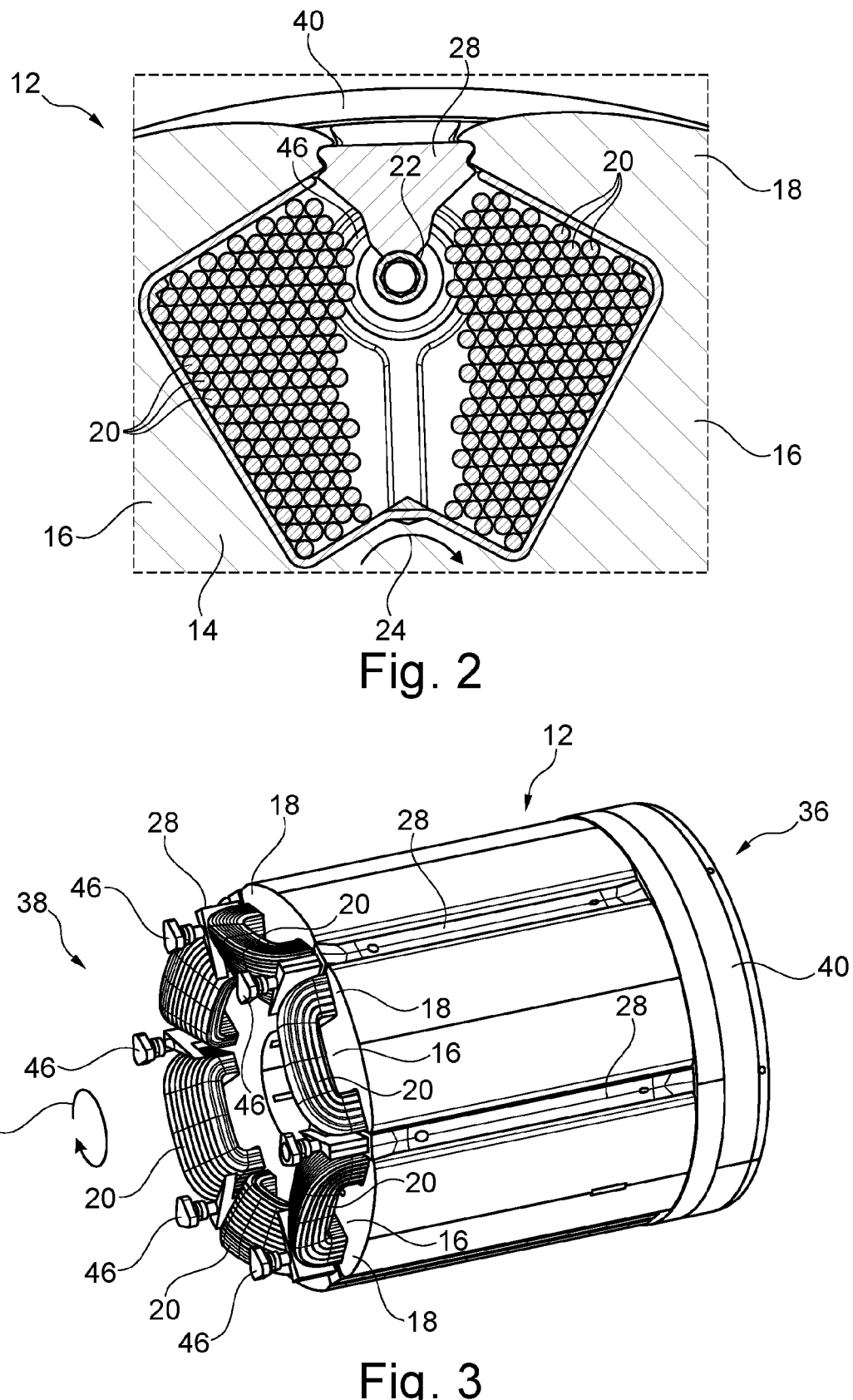
FIG. 2 shows a cross section of a region of the rotor with the windings winding around the adjacent pole limbs and with the cooling fluid line which is arranged between the pole limbs and the windings and is held on a cover slide which, in turn, is supported against respective pole shoes adjoining the pole limbs.
FIG. 3 shows a schematic perspective view of the rotor with respective cooling fluid lines which are arranged on the rotor in a manner distributed at regular intervals over a circumference of the rotor, and with a collecting ring which is arranged on an end face of the rotor and which is designed to collect cooling fluid flowing out of the hollow shaft and to supply the cooling fluid to the respective cooling fluid lines.

The rotor device 10 comprises a rotor 12 which comprises a laminated rotor core 14. This laminated rotor core 14 is provided by stacking a multiplicity of rotor laminations on one another in a stacking direction. In the present case, the laminated rotor core 14 provides a plurality of star-shaped pole limbs 16 which project radially from a central axis of the rotor 12 and can be seen particularly well in particular in FIGS. 2 and 3. These pole limbs 16 are adjoined outward in the radial direction by respective pole shoes 18. As can be seen in FIGS. 2 and 3, respective windings 20 are wound around the respective pole limbs 16 to provide coils. For the sake of clarity, only some of the windings 20 are identified by the reference number 20. In order to be able to particularly readily cool the windings 20 of the rotor 12, the rotor device 10 comprises a plurality of cooling fluid lines 22 which extend with their direction of longitudinal extent parallel to a central axis of the rotor 12.

In FIG. 2, the arrangement of the respective cooling fluid lines 22, which extend within the rotor 12, can be seen particularly readily. Each cooling fluid line 22 is arranged in the circumferential direction 24 between two pole limbs 16 of the laminated rotor core 14. In this case, the respective cooling fluid line 22 is furthermore arranged in the circumferential direction 24 between windings 20 winding in each case around different pole limbs 16. The cooling fluid lines 22 are designed to guide a cooling fluid 26 between the pole limbs 16 and between the windings 20. By this means, heat can be particularly readily absorbed from the windings 20 and from the pole limbs 16 by means of the cooling fluid 26. The cooling fluid 26 can be in particular oil or water. In order to be able to fix the respective cooling fluid lines 22 particularly readily relative to the pole limbs 16 and relative to the windings 20, the rotor device 10 furthermore comprises a cover slide 28 for each cooling fluid line 22. The respective cooling fluid lines 22 can be held slidingly on the respective associated cover slide 28. The cover slide 28 together with the pole shoes 18 and the pole limbs 16 can circumferentially surround a volume in which the windings 20 and the respective cooling fluid line 22 are arranged. In order to prevent displacement of the windings 20 and of the respective cooling fluid line 22 in the volume, a clearance in the volume can be filled by a rotor potting compound.

The rotor device 10 furthermore comprises a hollow shaft 30 on which the rotor 12 can be held for conjoint rotation. This means that, when the rotor 12 rotates, the hollow shaft 30 is rotated at the same time, or, when the hollow shaft 30 rotates, the rotor 12 is rotated together with the hollow shaft 30. The hollow shaft 30 surrounds a cavity 32 through which the cooling fluid 26 can flow. For cooling of the hollow shaft 30, the cooling fluid 26 is therefore guided into the cavity 32 of the hollow shaft 30. In order to permit cooling both of the hollow shaft 30 and of the windings 20 and the pole limbs 16 by means of the cooling fluid 26, the hollow shaft 30 has at least one radial opening 34, in the present case a plurality of radial openings 34, via which the cooling fluid 26 guided in the hollow shaft 30 can flow radially out of the hollow shaft 30. In particular, the hollow shaft 30 has at least one, in particular a plurality of, radial openings 34 assigned to a first end face 36 of the rotor 12, and at least one, in the present case a plurality of, radial openings 34 assigned to a second end face 38 of the rotor 12.

For trapping the cooling fluid 26 flowing radially out of the hollow shaft 30 via the respective radial openings 34, the rotor device 10 in the present case comprises two collecting rings 40, of which a first collecting ring 40 is arranged on the first end face 36 of the rotor 12 and the second collecting ring 40 is arranged on the second end face 38 of the rotor 12. The respective collecting rings 40 are designed to trap the cooling fluid 26 flowing out of the hollow shaft 30 via the radial openings 34. For this purpose, the respective collecting rings 40 each have a channel 42 in which the cooling fluid 26, which has flowed radially away from the hollow shaft 30, can be trapped. The respective collecting rings 40 each have fluid openings 44, with at least one fluid opening 44 being provided per collecting ring 40 for each cooling fluid line 22. In the present case, an adapter 46 is inserted into each fluid opening 44. Each adapter 46 is connected in turn to a cooling fluid line 22, in particular is plugged onto the associated cooling fluid line 22, as a result of which the cooling fluid 26 can be guided from the adapter 46 to the inserted cooling fluid line 22 or from the cooling fluid line 22 to the plugged-on adapter 46. This adapter 46 can be designed either to supply the cooling fluid 26, which is collected in the channel 42, to the respective cooling fluid line 22 connected to the adapter 46, in order to permit the cooling fluid 26 to flow into the cooling fluid line 22, or can be designed to serve as an outlet element for the cooling fluid line 22 connected to the adapter 46. If the adapter 46 is used as an outlet element, the adapter 46 is then designed to receive the cooling fluid 26, which is guided in the cooling fluid line 22 connected to the outlet element, and to deflect said cooling fluid radially outward, as a result of which the cooling fluid 26 can flow radially out of the rotor 12. The adapter 46 can be provided made from a plastic.

In order to be able to ensure that each adapter 46 is held on the rotor 12, the adapters 46 can each have a slot 48 via which the respective adapter 46 can form a form fit with the rotor potting compound. In the respective collecting rings 40, respective adapters 46 arranged in the circumferential direction 24 can be designed in an alternating manner to supply the cooling fluid 26 to the associated cooling fluid line 22 and to conduct the cooling fluid 26 away from the respective associated cooling fluid line 22. This makes it possible for cooling fluid lines 22 which follow one another, and are therefore adjacent, in the circumferential direction 24 to have mutually diametrically oppositely directed cooling fluid guide directions 50.

Figure 4:
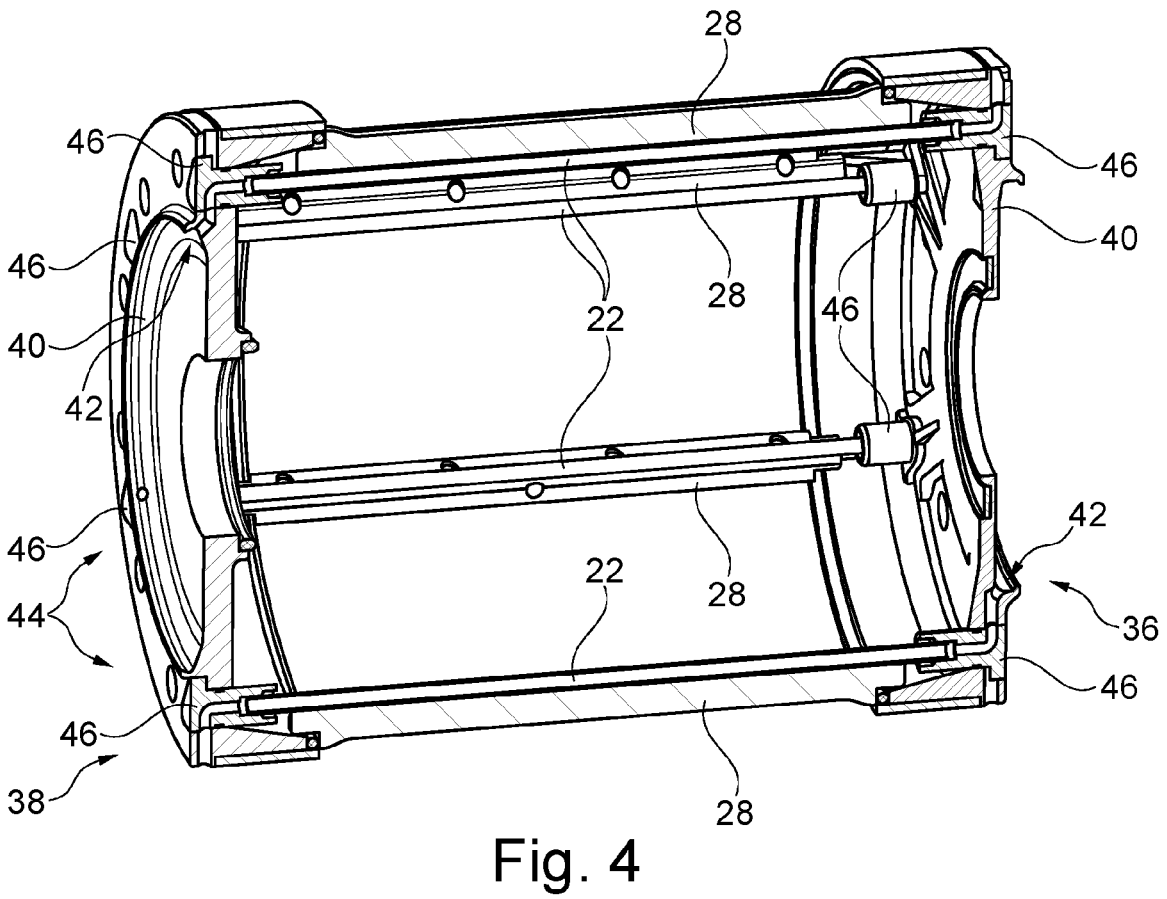
FIG. 4 shows a sectioned perspective view of two collecting rings which can each be placed onto the rotor, on an end face of the rotor, and respective cooling fluid lines which extend from a first of the collecting rings as far as a second of the collecting rings and are connected to the collecting rings via respective adapters and outlet elements via which the cooling fluid can be guided from the collecting rings to the cooling fluid lines and from the cooling fluid lines to the collecting rings, respectively.

As can be seen particularly readily in FIG. 3, the cooling fluid lines 22 can be arranged distributed over the circumference of the rotor 12 at regular intervals along the circumferential direction 24. For clarity reasons, the collecting ring 40 which is to be arranged on the second end face 38 of the rotor 12 is not shown in FIG. 3. In FIG. 4, the collecting rings 40 to be arranged on the end faces of the rotor 12, the cooling fluid line 22 and the adapters 46 are shown. It can be seen particularly readily in FIG. 4 that the adapters 46, depending on the arrangement on the associated collecting ring 40, are designed to supply cooling fluid 26, which is collected in the channel 42, to the respective connected cooling fluid line 22, or to deflect the cooling fluid 26, which is guided in the connected cooling fluid line 22, radially outward in order to permit the cooling fluid 26 to flow radially out of the rotor device 10. The use of the same adapter 46 both for guiding the cooling fluid 26 out of the channel 42 to the respective associated cooling fluid line 22 and the use of the adapter 46 as an outlet element permit the rotor device 10 to be provided with particularly few components differing from one another.

Figure 5:
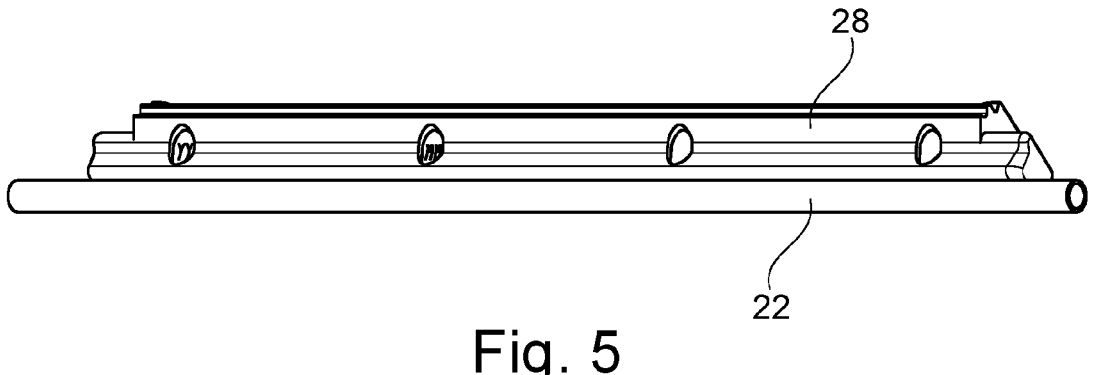
FIG. 5 shows a schematic side view of a cooling fluid line which is held on a cover slide.

FIG. 5 separately shows the cooling fluid line 22 which is held slidingly on the associated cover slide 28. In the present case, the cover slide 28 is provided made from plastic. The cooling fluid line 22 can be provided by a slotted tube formed from aluminum and/or copper and/or steel.

Figure 6:
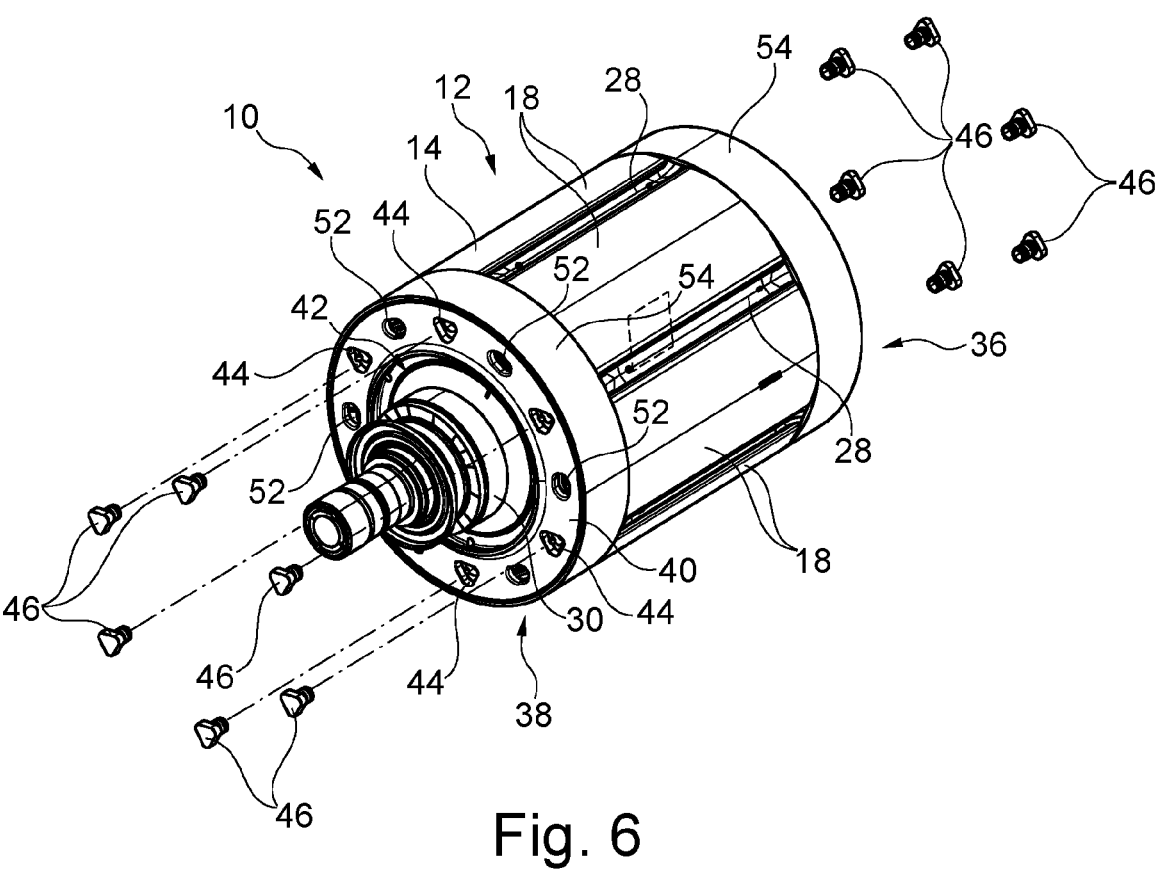
FIG. 6 shows a schematic exploded illustration of the rotor device, in which the cooling fluid lines and the cover slides are arranged between the respective pole limbs of the rotor, the rotor is plugged onto the hollow shaft, and the collecting rings are arranged on respectively mutually opposite end faces of the rotor, wherein the respective adapters and outlet elements are illustrated spaced apart from the collecting rings so as to be able to particularly readily see the position thereof on the collecting rings.

FIG. 6 shows an assembly step for assembling the rotor device 10. During the assembly of the rotor device 10, provision is made for the rotor 12 to be wound. The cover slides 28 can subsequently be inserted together with the cooling fluid lines 22 into the rotor 12. The collecting rings 40, which can be in particular supporting rings, can then be placed on the respective end faces 36, 38 of the rotor 12. There are increased requirements here regarding an angular position of the collecting rings 40 in relation to respective rotor teeth of the rotor 12 and in relation to the cooling fluid lines 22. The adapters 46 acting as sealing elements can subsequently be inserted into the respectively associated fluid openings 44 in the collecting rings 40. In a further method step, the rotor potting compound can be introduced between the pole limbs 16 of the rotor 12 via filling openings 52 in the respective collecting rings 40. The rotor potting compound can be in particular casting resin. For fixing the respective cover slides 28 relative to the collecting rings 40, a steel ring 54 can be provided for each collecting ring 40 on the outer side of the rotor device 10, the steel ring surrounding the rotor 12 and the associated collecting ring 40 circumferentially and therefore radially outward. The cooling fluid 26 which is deflected radially outward by the outlet element or the adapter 46 can flow out of the rotor device 10 via an annular gap 56 between the steel ring 54 and the associated collecting ring 40.

Figures 7A, 7B, 7C:
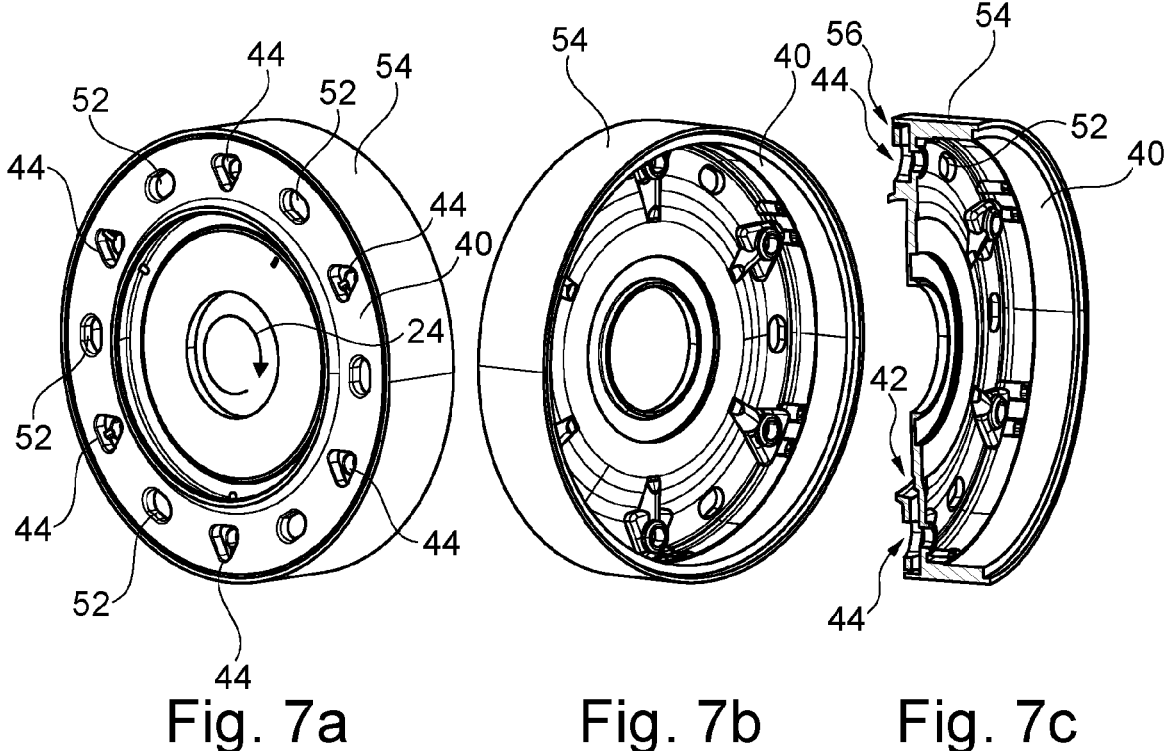
FIGS. 7a, 7b, and 7c show respective different perspective views and a sectioned perspective view of one of the collecting rings which has fluid openings into which respective adapters are to be plugged in order to guide cooling fluid collected by means of the collecting ring to the respective cooling fluid lines which are connected to the collecting ring via the adapters.

FIGS. 7*a* to 7*c* show a collecting ring 40 in different perspective illustrations and in a sectioned perspective illustration. In this case, the collecting ring 40 is surrounded on the outer circumference by the steel ring 54. As can be seen particularly readily in FIG. 7*a*, respective filling openings 52 for the rotor potting compound and respective fluid openings 44 can be arranged alternating in the circumferential direction 24. Fluid openings 44 following one another in the circumferential direction 24 can be designed in an alternating manner to receive respective adapters 46 which are designed to supply cooling fluid 26, which has been collected by the channel 42, to the associated cooling fluid line 22 and to guide cooling fluid 26, which has been received from the associated cooling fluid line 22, radially outward away from the cooling fluid line 22 and to conduct it out of the rotor device 10 via the annular gap 56. For this purpose, mutually adjacent adapters 46 in the circumferential direction 24 can be rotated in their orientation relative to a central axis of the rotor 12 or of the hollow shaft 30, in particular can be rotated in their orientation relative to the central axis of the rotor 12 by 180° about the central axis of the rotor 12.

In the present case, the respective adapters 46 have a basic element with a substantially triangular cross section, wherein the basic elements of the adapters 46 serving as outlet elements are oriented with a point toward the central axis of the rotor 12. Those adapters 46 which are designed to supply the cooling fluid 26 from the channel 42 of the respective collecting ring 40 to the connected cooling fluid line 22 are inserted with their basic element into the respective associated collecting ring 40 in such a manner that a point of the triangular cross section of the basic element faces away from the central axis of the rotor 12. By respective adjustment of the orientation of the adapter 46, in particular of the basic element of the respective adapter 46, relative to the central axis of the rotor 12 or the central axis of the hollow shaft 30, the adapter 46 can therefore serve as an outlet element or for supplying the cooling fluid 26 from the channel 42 of the respective collecting ring 40 into the associated cooling fluid line 22.

The present disclosure is based on the basic concept of trapping the cooling fluid 26 on the end faces 36, 38 after it has been sprayed out of the hollow shaft 30 and of conducting it between slots of the rotor 12 of the current-excited synchronous machine. The cooling fluid 26 can emerge on the opposite side of the rotor 12 where it can cool winding heads of the stator of the electric machine. By the cooling fluid 26 being guided into a rotor slot of the rotor 12, heat can be removed at the location at which it arises, as a result of which a particularly large amount of heat can be removed from the rotor 12. In addition, the rotor 12 can be actively cooled by cooling the hollow shaft 30 by means of the cooling fluid 26.

The cooling fluid 26 sprays out of the hollow shaft 30 on both sides of the rotor 12. The inwardly open collecting ring 40, which has the channel 42 for trapping the cooling fluid 26, is in each case arranged on the end faces 36, 38 of the rotor 12, with the cooling fluid 26 collecting in the channel 42. The cooling fluid 26 can be held here in the respective collecting ring 40 by a centrifugal force and can be pressed radially outward. The respective collecting ring 40 at the same time constitutes an overflow in the situation in which the cooling fluid lines 22 cannot completely accommodate a cooling fluid flow, in particular an oil volume flow. In this case, the cooling fluid 26 passes over an edge of the respective collecting ring 40 and flows radially outward directly onto a respective winding head. When end faces of the rotor 12 are manufactured from aluminum, the cooling fluid 26 in the region of the collecting ring 40 can already absorb heat from the windings 20 of the rotor 12.

The cooling fluid 26 is guided from the respective collecting ring 40 through radial bores, which are arranged on the end faces 36, 38 of the rotor 12, into the respective adapters 46. The respective adapter 46 constitutes a bridge between the respective collecting ring 40 on the end face 36 or 38 and the cooling fluid lines 22. The adapter 46 can preferably be composed of an elastic plastic and combine a plurality of functions. Firstly, the adapter 46 permits sealing in relation to the respective collecting ring 40 and the cooling fluid lines 22 so as to avoid inadvertent escape of cooling fluid and so as to avoid ingress of rotor potting compound during production. Furthermore, the adapter 46 permits length compensation of the cooling fluid lines 22 and of the laminated rotor core 14 due to manufacturing tolerances. Furthermore, the adapter 46 permits compensation of an angle of rotation of the collecting rings 40 in relation to the cooling fluid lines 22 due to manufacturing tolerances. Furthermore, the adapter 46 permits securing of the adapter 46 against slipping out, by means of a form fit with the rotor potting compound by the slot 48 which can be surrounded by the rotor potting compound. The adapter 46 can be assembled axially from the outside in the respective collecting ring 40, wherein said assembly can constitute a final step in the assembly of the rotor device 10. By this means, the collecting rings 40 can be rotated relative to the rotor 12 during the assembly and, during this rotation, do not collide with the cooling fluid lines 22.

The cooling fluid lines 22 which are provided in particular made from a metal conduct the cooling fluid 26 to a location at which the heat arises, at the windings 20 of the current-excited synchronous machine. The flow of the cooling fluid 26 is guided in such a manner that the cooling fluid guide direction 50 in the slots and therefore in the circumferential direction 24 alternates between the respective pole limbs 16. This means that, in every second cooling fluid line 22, the cooling fluid 26 flows in a first direction and, in the remaining cooling fluid lines 22, the cooling fluid 26 flows in a second direction opposite to the first direction. The respective cooling fluid lines 22 can be integrated in the respective associated cover slides 28, in particular by means of insert molding with a thermoplastic or a thermosetting plastic. The cooling fluid lines 22 and/or the cover slides 28 can alternatively be manufactured from a highly heat-conductive ceramic. In particular, the cooling fluid lines 22 and the associated cover slides 28 can be manufactured in one piece or in two pieces.

After the cooling fluid 26 has flowed through the cooling fluid lines 22, it flows from the rotor 12 radially outward. In this case, use can be made of the further adapter 46 which serves as an outlet element and is mounted rotated by 180° relative to the central axis of the rotor 12 and the hollow shaft 30 in comparison to respective adapters 46, by means of which the cooling fluid 26 can be conducted from the respective collecting ring 40 into the associated cooling fluid line 22. By this means, the cooling fluid 26 is conducted outward from the cooling fluid line 22 by means of the adapter 46 serving as an outlet element. The cooling fluid 26 can flow through bores in respective rotor end faces onto winding heads of the stator.

Overall, the present disclosure shows how high-power cooling can be provided for rotors 12 of electric drive machines.

LIST OF REFERENCE SIGNS

10 Rotor device
12 Rotor
14 Laminated core
16 Pole limb
18 Pole shoe
20 Winding
22 Cooling fluid line
24 Circumferential direction
26 Cooling fluid
28 Cover slide
30 Hollow shaft
32 Cavity
34 Radial opening
36 First end face
38 Second end face
40 Collecting ring
42 Channel
44 Fluid opening
46 Adapter
48 Slot
50 Cooling fluid guide direction
52 Filling opening
54 Steel ring

The invention claimed is:

1. A rotor device for an electric machine, comprising:
   a rotor which comprises a laminated rotor core that comprises a plurality of pole limbs which project radially from a central axis of the rotor and around which respective rotor windings can be wound;
   at least one cooling fluid line which extends in a circumferential direction between adjacent pole limbs with its direction of longitudinal extent parallel to the central axis of the rotor and which is configured such that a cooling fluid flows through it for cooling the rotor; and
   at least one collecting ring that is arranged on an end face of the rotor and which is designed to collect cooling fluid flowing along the end face and to provide the cooling fluid for the at least one cooling fluid line,
   wherein the collecting ring for the at least one cooling fluid line has a fluid opening in which an adapter is inserted, the adapter being designed to supply the cooling fluid collected by the collecting ring to the respective cooling fluid line adjoining the adapter, and
   wherein the adapter has a slot which is designed to form a form fit with a rotor potting compound of the rotor.

2. The rotor device according to claim 1,
   wherein one or more of the at least one cooling fluid lines is provided in the circumferential direction for each intermediate space between adjacent pole limbs, the cooling fluid lines each being designed to convey the cooling fluid in an opposite direction to the cooling fluid lines which are directly adjacent in the circumferential direction.

3. The rotor device according to claim 1,
   wherein each cooling fluid line is integrated in a respective cover slide.

4. The rotor device according to claim 1,
   wherein the at least one cooling fluid line has a length portion in which the cooling fluid line is surrounded circumferentially by a rotor potting compound.

5. The rotor device according to claim 1,
   wherein the rotor device comprises a hollow shaft on which the rotor is held for conjoint rotation and which predetermines an axis of rotation of the rotor, the hollow shaft being designed for the cooling fluid to flow through it, and the hollow shaft having at least one radial opening via which the cooling fluid can flow out of the hollow shaft in order to flow to the at least one cooling fluid line.

6. The rotor device according to claim 5,
   wherein the at least one collecting ring surrounds the hollow shaft circumferentially and is designed to collect the cooling fluid, which has emerged via the at least one radial opening in the hollow shaft, and to provide the cooling fluid for the at least one cooling fluid line.

7. The rotor device according to claim 1,
   wherein the collecting ring has a channel which runs in the circumferential direction, is open toward the hollow shaft and in which the collected cooling fluid can be held by centrifugal force.

8. The rotor device according to claim 1,
   wherein, on each cooling fluid line there is arranged an outlet element via which the cooling fluid, after flowing through the respective cooling fluid line, can flow out from the latter, the outlet element being configured to deflect the cooling fluid outward in a radial direction.

\* \* \* \* \*